United States Patent
Takeuchi

[15] 3,645,013
[45] Feb. 29, 1972

[54] TEACHING MACHINE USING ELECTRICALLY CONDUCTIVE TRAINING CARDS

[72] Inventor: Kouji Takeuchi, Tokyo, Japan
[73] Assignee: Kabushiki Kaisha Gakushu Kenkyusha, Tokyo, Japan
[22] Filed: Dec. 12, 1969
[21] Appl. No.: 884,472

[30] Foreign Application Priority Data

Dec. 28, 1968  Japan..............................43/114457

[52] U.S. Cl. .............................................................35/9 C
[51] Int. Cl. ......................................................G09b 7/00
[58] Field of Search ........................................35/9, 9 C, 9 D

[56] References Cited

UNITED STATES PATENTS

| | | | |
|---|---|---|---|
| 2,627,672 | 2/1953 | Polton | 35/9 R |
| 2,656,617 | 10/1953 | Composto | 35/9 R |
| 2,860,422 | 11/1958 | May | 35/9 R |
| 2,893,137 | 7/1959 | Alling et al. | 35/9 R X |

FOREIGN PATENTS OR APPLICATIONS 130,989  1/1949  Australia.....................................35/9

Primary Examiner—Wm. H. Grieb
Attorney—Robert E. Burns and Emmanuel J. Lobato

[57] ABSTRACT

A teaching machine is provided with a plurality of normally open electric current paths each connected to an indicator. The current paths are arranged in accordance with a predetermined program and are individually closed to actuate the indicator by means of an electrically conductive training card which is positionable on the teaching machine. Each training card has various pairs of correlated indicia on one side and electrically conductive paths on the other side, the conductive paths being arranged to overlie and make electrical contact with respective ones of the current paths of the teaching machine when the training card is positioned thereon. Each training card is also provided with an aperture adjacent each indicia and a pair of plugs are provided which are insertable through individual apertures and function to close one of the current paths and thereby actuate the indicator when the user inserts the plugs through the apertures corresponding to one of the pairs of correlated indicia.

7 Claims, 5 Drawing Figures

Patented Feb. 29, 1972

TEACHING MACHINE USING ELECTRICALLY CONDUCTIVE TRAINING CARDS

The present invention relates to a manually operable teaching machine which permits the operator of the machine to teach and instruct himself. More particularly, the invention is directed to a teaching machine whereby the operator or pupil may select a question and then choose the appropriate answer from a group of possible answers. If the answer selected is correct, such will automatically be indicated to the pupil by a suitable indicator.

Different types of teaching machines in general adopt what is known as the dialogical method or the question-and-answer system for the study processes. Popular dialogical methods now in use are the method of choice and the method of paired association. The former is the system of selecting an answer for a given question from among an answer group while the latter is the system of reproducing correct and corresponding paired relationships from randomly orientated pairs of related information.

Japanese Pat. No. 523,468 discloses an apparatus applicable to the method of choice technique and Japanese Utility Model No. 457,381 discloses the method of paired association.

The present invention is directed to the method of paired association. A typical apparatus used to practice the broad concept of such a method generally comprises training cards having thereon indicia representative of a pair of affairs in definite relation (for example, a group of questioned formula for arithmetic calculations and a group of corresponding answers), a teaching machine adapted to receive the training cards in a definite, preselected position thereby forming electrically conductive lines between the paired indicia and a signal system including two plugs for electrically connecting the correctly paired indicia to an indicator. However the conventional teaching apparatus of this type has a serious defect in that it is restricted to one definite current wiring system for each pair of corresponding indicia on the training card since the wiring lines are permanently laid in the machine body. Therefore the questions and their corresponding answers on each training card are always arranged in the same, definite relationship making it relatively easy for the user to memorize, whether intentionally or subconsciously, the positions for obtaining a correct answer even though he does not really know same.

In other words, there exists the disadvantage that a set of training cards, even though used for different purposes, such as addition, subtraction, multiplication and division, have the same corresponding relationship between the question and its correct answer. This type of system permits a pupil to remember the positional relationship of correct answers after having used the teaching machine many times and allows the pupil to resort to his instinctive memory rather than the inspection of questions and answers. In this case, the machine is evidently unsuitable as a teaching machine and hence cannot be used repeatedly.

A principal object of the present invention is to provide a series of training cards whereon the positional relationship between the correlated indicia is mutually independent as between the various training cards.

Another object of the invention is to provide a teaching machine having a plurality of normally open electric current paths each connected to an indicator and which are selectively closed by the user in cooperation with a training card.

The teaching machine of the present invention will be explained in detail with reference to the preferred embodiment shown in the accompanying drawings.

Figure 1:
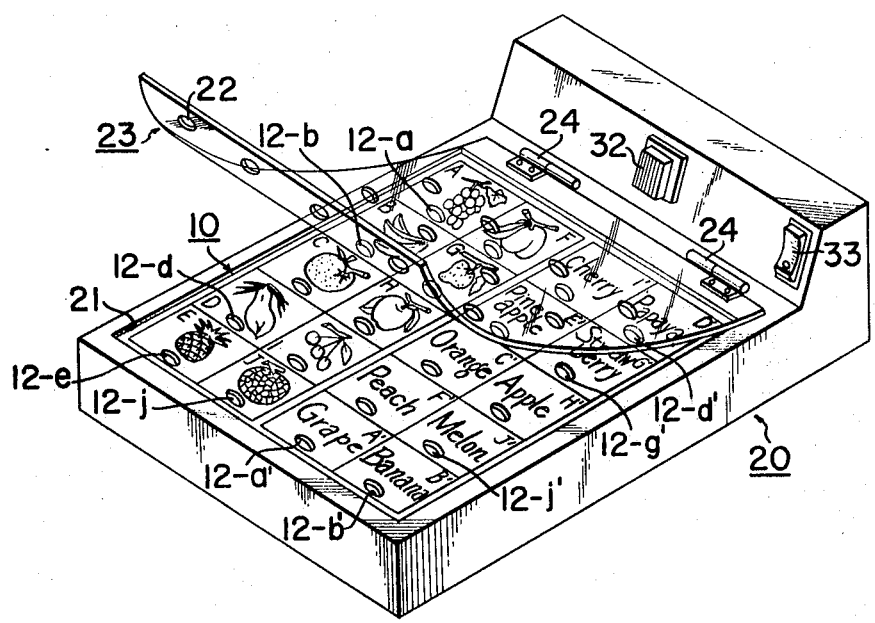
FIG. 1 is a perspective view of the teaching machine of the present invention showing a training card in its operating position.
Figure 2:
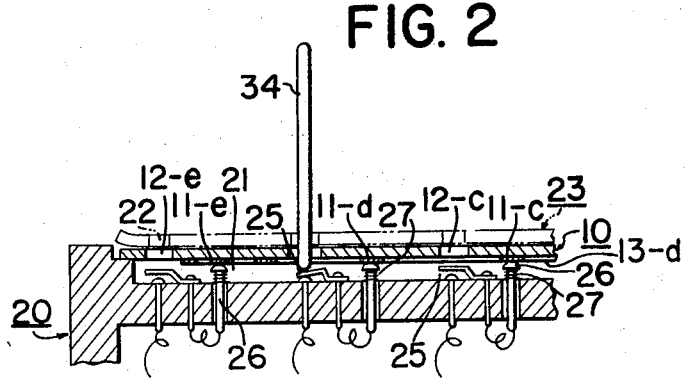
FIG. 2 is an enlarged cross-sectional view of one embodiment of a switch mechanism used in the teaching machine.
Figure 3:
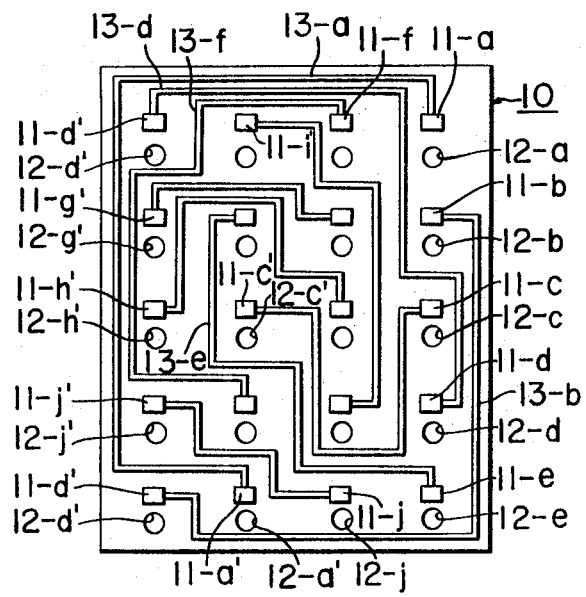
FIG. 3 is a plan view of the backface of a training card usable with the teaching machine of the present invention.

A surface portion of a training card 10 of rectangular cardboard, plastic sheet or other insulating sheet material is divided into two groups of correlated indicia or affairs A, B ... L and A', B', ... L', respectively each group being randomly arranged in accordance with a predetermined program. Each indicia A, B ... L, A', B', ... L' has a corresponding aperture or answering window $12-a$, $12-a'$, $12-b$ ... $12-l$, $12-l'$ positioned adjacent thereto. Hereafter, reference characters followed by $a, b ... l, a', b' ... l'$ correspond respectively to elements associated with the indicia A, B, ... L, A', B', ... L'. The expression "definite affairs in the definite relationship" suggests, for example, the relationship between a "picture" and its denoting "letters" or between "question formula" of an arithmetic calculation and its corresponding "answer value." The subject or general content of the indicia or affairs are placed in the headline on each card according to the purpose or objective of the training. The training card shown in FIG. 1 is designed to study fruits and contains pictures of various kinds of fruits (sections A, B, ... L) and the corresponding letters (section A', B', ... L') divided into two groups which are randomly disposed on the front surface of the card. On the back surface or face of the training card 10 is provided a plurality of electrical contact segments $11-a$, $11-b$, ... $11-l$, $11-a'-b'$, ... $11-l'$ and each related pair of contacts $12-a$ and $12-a'$, $12-b$ and $12-b'$, ... $12-l$ and $12-l'$ are respectively interconnected by means of electrically conductive paths $13-a$, $13-b$, ... $13-l$. The electrical contact segments and the conductive paths are formed by a conventional circuit printing technique with a coating material containing a conductor or a conductive coating material. In the case of laying conductive paths, care must be taken to insure that the paths do not cross or come in contact with each other. The connection and wiring of these conductive paths are preferably invisible and this is accomplished, for example, by using a printing ink of the same color as that of the substrate.

Figure 4:
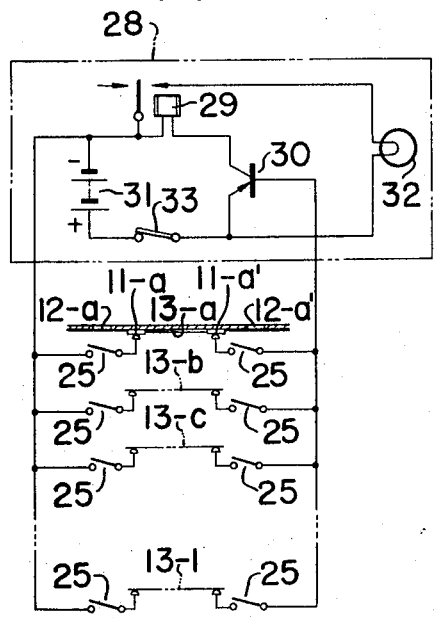
FIG. 4 is a schematic representation of an electric circuit used in the teaching machine.

The teaching machine 20 of the present invention is provided with a card admitting space 21 which is superposed with a card holding transparent plate 23 pivotally mounted at one end by a hinge 24. The transparent plate is provided with apertures or windows 22 corresponding in location to the answering windows 12 of the training card when the card is positioned on the machine. A flat spring-type switch 25 having a flexible and a stationary contact is mounted beneath the card admitting space 21 and positioned such that it lies beneath both the window 22 and the answering window 12 when a training card is suitably positioned in the card admitting space 21. A connecting bar 26 is continuously biased by means of a spring 27 into electrical contact with respective ones of the electrical contacts 11 on the training card when same is mounted in the card admitting space. A pair of plugs 34 (only one of which is shown) are used to bend the flexible contacts into engagement with the stationary contacts during use. FIG. 4 shows that the teaching machine includes a plurality of normally open electric current paths, each path having two normally open switches 25 and a third normally open switch defined by the two spaced-apart connecting bars 26 associated with respective pairs of the electrical contacts 11, such as $11-a$ and $11a'$, which correspond to the correlated pairs of indicia. When a training card is positioned in a playing position admitting space 21, its electrically conductive paths bridge the various pairs of connecting bars 26 in accordance with a predetermined pattern or program.

The teaching machine also has actuatable indicating means 28, as shown in FIG. 4, for providing a sensuous indication, such as a light or sound indication, whenever the user correctly relates the proper paired indicia. The indicating means comprises an electric circuit for actuating an indicator means, such as a miniature lamp 32 connected to a source of potential 31 through a relay 29 and a transistor 30. An on-off switch 33 is mounted on the machine and functions to connect the source of potential to the various circuits during use of the machine.

Figure 5:
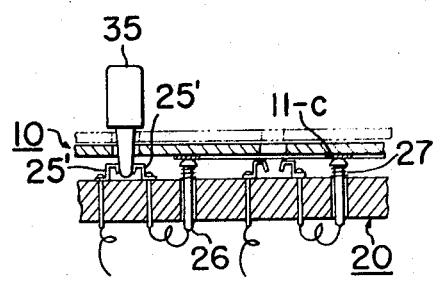
FIG. 5 is a cross-sectional view of another embodiment of a switch mechanism.

Another example of a switch mechanism for use with the teaching machine of the present invention is shown in FIG. 5. A pair of spaced-apart switch contacts 25' are disposed beneath the apertures 12 and 22. A pair of plugs 35 are provided with an electrically conductive portion which is dimensioned to fit between the opposed switch contacts 25' to thereby close the switch. The operation of the teaching machine will now be described. A training card 10 is positioned in the card admitting space 21 of the teaching machine body 20 and beneath the holding plate 23, as shown in FIG. 1. In this position, the electrical contact segments 11 attached to the back face of the card sections A, B, .... L, A', B', ... L' make electrical contact with the various electrical connecting bars 26 of the teaching machine body. In this condition, all corresponding sections A, A', B, B' ... L, L' are connected in parallel to the indicating means 28 as shown in FIG. 4.

When the training card 10 has been suitably positioned in the teaching machine body 20, the pupil or user tries to compare and match up the indications of plural card sections and searchs for a pair of correlated sections, for example, indicia A and A'. When the pupil correctly inserts a plug 34 or 35 (depending upon the particular type of switch mechanism employed) through the pair of answering windows 12–a and 12–a' for card sections A and A' to close the two normally open switches 25, the correctness of the pupil's answer is indicated by the lighting of the lamp 32. When the plugs are correctly inserted in the two apertures corresponding to one of the pairs of correlated indicia, its associated normally open electric current path on the training machine is closed and the transistor 30 is rendered conductive. As seen in FIG. 4, current will then flow through the emitter-base and the then closed electric current path as well as through the emitter-collector and the relay 29 to thereby actuate the light 32. In this manner, the pupil can recognize a definite relationship between card sections A and A'. The various pairs of correlated indicia are determined according to the object of the training as described before. Furthermore, other suitable sensuous indicators, such as a bell, may be substituted in place of the lamp.

A teaching machine according to the present invention is characterized by the following features:

(1) Since the surfaces of the training cards are printed by a conventional process, the cards are prepared by mass production to reduce the cost.

(2) In view of the fact that the functional elements of the electric circuits are mounted on the teaching machine body itself and that the training cards are printed on both faces, the present apparatus has no complicated elements and is relatively free from troubles of any sort.

(3) Since the training cards and the teaching machine body are electrically connected only through the electrical contact segments and connecting bars, the connections between the corresponding pairs of card sections can be varied from training card to training card so that the various correlated pairs of indicia may be placed in different positions to preclude the pupil from memorizing which two positions actuate the indicator and thereby defeat the purpose of the teaching machine.

From the above description of the teaching machine and training card of the present invention, it is evident that the structure of the apparatus of the invention is relatively simple in construction but provides good results as a self-study teaching machine.

What I claim and desire to secure by Letters Patent is:

1. A teaching machine comprising: means defining a plurality of normally open electric current paths, each said current path including only three normally open switches; actuatable indicating means electrically connected to each of said current paths operative when actuated to provide a sensuous indication in response to closing of any one of said normally open electric current paths; a training card positionable in a playing position over said plurality of normally open electric current paths to effect closure of one normally open switch in each of said electric current paths; and means coacting with said training card when same is in said playing position for selectively closing individual pairs of the remaining two normally open switches in each said normally open electric current path in accordance with a predetermined program to actuate said indicating means.

2. A teaching machine comprising: means defining a plurality of normally open electric current paths, each said current path including three normally open switches; actuatable indicating means electrically connected to each of said current paths for providing a sensuous indication in response to closing of any one of said normally open electric current paths; means for selectively closing individual ones of said normally open electric current paths in accordance with a predetermined program comprising a training card positionable in a playing position overlying said current paths, means defining a plurality of electrically conductive paths disposed on said training card in accordance with a predetermined program operative to close only one of said normally open switches in each of said current paths when said training card is in said playing position, and means defining a plurality of apertures in said training card each overlying one of said remaining normally open switches when said training card is in said playing position; and a pair of plugs manually insertable through said apertures effective to selectively close the remaining two normally open switches in one of said electric current paths to actuate said indicating means.

3. A teaching machine according to claim 2; wherein each of said normally open switches not closed by said electrically conductive paths on said training card comprises a pair of spaced apart electrical contacts; and wherein said pair of plugs each have an electrically conductive portion dimensioned to fit between said spaced apart electrical contacts to close said switch.

4. A teaching machine according to claim 2; wherein each of said normally open switches not closed by said electrically conductive paths on said training card comprises a stationary electrical contact and a flexible electrical contact spaced apart from said stationary contact and movable into electrical contact therewith by one of said plugs.

5. A teaching machine according to claim 2; wherein each of said electric current paths has a positive terminal and a negative terminal; and wherein said indicating means comprises means defining a source of electric potential, electrically actuated indicator means electrically connected to said source for indicating when one of said normally open electric current paths is closed, and means including another switch for electrically connecting said positive and negative terminals to said source to effect actuation of said indicator means through said another switch when one of said normally open current paths is closed.

6. A teaching machine according to claim 5; wherein said another switch comprises a transistor having conductive and nonconductive modes of operation.

7. A teaching machine according to claim 6; wherein said electrically actuated indicator means includes an electrical relay electrically connected between said source and transistor operative when said transistor is operating in its conductive mode to actuate said indicator means.

* * * * *